US011442867B2

(12) United States Patent
Isenegger et al.

(10) Patent No.: US 11,442,867 B2
(45) Date of Patent: Sep. 13, 2022

(54) USING A SECOND CONTENT-ADDRESSABLE MEMORY TO MANAGE MEMORY BURST ACCESSES IN MEMORY SUB-SYSTEMS

(71) Applicant: Micron Technology, Inc., Boise, ID (US)

(72) Inventors: Laurent Isenegger, Morgan Hill, CA (US); Dhawal Bavishi, San Jose, CA (US); Jeffrey Frederiksen, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/228,336

(22) Filed: Dec. 20, 2018

(65) Prior Publication Data

US 2020/0201776 A1    Jun. 25, 2020

(51) Int. Cl.
*G06F 12/0879*    (2016.01)
*G06F 12/12*    (2016.01)

(52) U.S. Cl.
CPC ......... *G06F 12/0879* (2013.01); *G06F 12/12* (2013.01); *G06F 2212/1041* (2013.01); *G06F 2212/281* (2013.01)

(58) Field of Classification Search
CPC ................. G06F 12/0879; G06F 12/12; G06F 2212/1041; G06F 2212/281; G06F 2201/885; G06F 2201/81; G06F 2212/502; G06F 11/3409; G06F 12/0895; G06F 12/127; G06F 11/3037; G06F 12/0864; G06F 12/123; G06F 11/3466; G06F 2201/88; G06F 2212/1024; Y02D 10/00

USPC .................................................. 711/130, 118
See application file for complete search history.

(56) References Cited

U.S. PATENT DOCUMENTS

| | | | | |
|---|---|---|---|---|
| 2002/0087802 | A1* | 7/2002 | Al-Dajani | G06F 9/3832 711/137 |
| 2005/0044317 | A1* | 2/2005 | Rivers | G06F 12/0897 711/118 |
| 2011/0072218 | A1* | 3/2011 | Manne | G06F 12/123 711/136 |
| 2013/0138873 | A1* | 5/2013 | Gorobets | G06F 3/064 711/103 |
| 2014/0025898 | A1* | 1/2014 | Iyengar | G06F 12/084 711/130 |
| 2014/0325138 | A1* | 10/2014 | Hu | G06F 12/0826 711/108 |

(Continued)

*Primary Examiner* — David Yi
*Assistant Examiner* — Zubair Ahmed
(74) *Attorney, Agent, or Firm* — Lowenstein Sandler LLP (57) ABSTRACT

A request to access data at an address is received from a host system. A tag associated with the address is determined to not be found in first entries in a first content-addressable memory (CAM) or in second entries in a second CAM. Responsive to determining that the tag is not found in the first entries or in the second entries, a particular entry of the first entries that each includes valid data is selected. A determination is made whether the particular entry satisfies a condition indicating that content in the particular entry is to be stored in the second CAM. The content is associated with other data stored in the cache. Responsive to determining that the condition is satisfied, the content of the particular entry is stored in one of the second entries to maintain the data in the cache.

20 Claims, 7 Drawing Sheets

(56) References Cited

U.S. PATENT DOCUMENTS

2015/0149721 A1* 5/2015 Kannan ............... G06F 12/0891
711/122

* cited by examiner

USING A SECOND CONTENT-ADDRESSABLE MEMORY TO MANAGE MEMORY BURST ACCESSES IN MEMORY SUB-SYSTEMS

TECHNICAL FIELD

Embodiments of the disclosure relate generally to memory sub-systems, and more specifically, relate to using a second content-addressable memory to manage memory burst accesses in memory sub-systems.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to using a second content-addressable memory to manage memory burst accesses in memory sub-systems. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. In some host systems, the performance of applications executing on the host system can highly depend on the speed at which data can be accessed in a memory sub-system. To accelerate data access, conventional memory sub-systems use spatial and temporal locality of memory access patterns to optimize performance. These memory sub-systems can use high-performance, lower-capacity media, referred to as caches, to store data that is accessed frequently (temporal locality) or data located in a memory region that has recently been accessed (spatial locality).

The design and architecture of caches impact the memory sub-system performance, which can impact the performance of applications executing on the host system. For example, since caches can generally store a limited amount of data, when an application starts executing on the host system and requests memory accesses, the cache can fill up rapidly. Thus, the architecture of the conventional memory sub-system can include a set of rules to determine which data should remain in the cache and which data should be removed (e.g., evicted or overwritten). This set of rules can be referred to as "eviction policy." In conventional memory sub-systems, a cache can use an eviction policy referred to as least-recently used (LRU) policy, which includes removing data from the cache that has been least recently accessed by the host system.

The LRU policy takes advantage of the temporal locality of the memory access patterns. However, an eviction policy strictly based on LRU can fail to identify regions of the memory sub-system that have been frequently accessed in the past and that are likely to be frequently accessed again in the future. Some applications generate memory traffic patterns where a memory region is periodically accessed very frequently in a short time period. In between each one of these set of frequent accesses (i.e., bursts), other memory regions are being read and written by the application. When using a LRU policy or other eviction policies, the cache can evict the data related to the memory region frequently accessed in each burst. The eviction of the data related to the memory region can then result in slower access times and lower application performance when the next burst to the same memory region needs to be processed.

For example, the data that is requested in the burst can be retrieved from a backing store (e.g., memory component) and added to the cache. The retrieval of such data requested in the burst can increase the number of accesses to the memory component, which can lower the endurance of the memory component. Further, the memory component can have a slower access speed as compared to the cache, and thus, each time the data is retrieved from the memory component instead of the cache, performance of the memory sub-system and/or requesting application of the host system can be reduced.

Aspects of the present disclosure address the above and other deficiencies by using a cache architecture that maintains data frequently accessed within certain time periods (e.g., bursts) in the cache, thereby improving the host system and/or memory sub-system performance and reducing media wear of memory components in a memory sub-system when the bursts are requested in the future. The cache architecture uses a first content-addressable memory (CAM) (e.g., primary CAM) and a second CAM. The second CAM can be used to store content of a particular line ("line," "cache line," and "entry" can be used interchangeably herein) that is selected to be removed from the first CAM to maintain the data associated with the content in the cache. In some instances, the first CAM can become full when every line in the first CAM includes valid data. The first CAM can use a policy to remove lines when the CAM is full. The policy used by the first CAM can be the LRU policy. A determination can be made to store content associated with lines selected for removal from the first CAM in the second CAM using one or more conditions (e.g., statistics related to a frequency of access to the line, a page in the line, pattern of memory usage, etc.).

In some embodiments, a request can be received to access data at an address from a host system. A tag (i.e., an identifier) associated with the address can be searched for in the first CAM and the second CAM. If a matching tag for the requested address is found in the first CAM (first CAM hit), an indicator (e.g., counter) associated with the LRU policy ("LRU indicator") can be updated to indicate that the line including the matching tag and requested address has been recently used. Further, another indicator (e.g., counter) associated with a most frequently used (MFU) policy ("MFU indicator") can be updated to indicate that the line including the matching tag and requested address has been used again. The address of the cache line in the first CAM can be used to access data in the cache.

If a matching tag is not found in the first CAM but is found in the second CAM (second CAM hit), an LRU indicator can be updated in the second CAM to indicate that the line including the matching tag and requested address has been recently used. The address of the cache line in the second CAM can be used to access data in the cache.

If no matching tag is found in either the first CAM or the second CAM, the data requested is not available in the cache. The data can be retrieved from one or more memory components. The data can be stored in the cache and a cache line can be allocated in the first CAM to store content (e.g., tag, metadata, LRU indicator, MFU indicator, address, etc.) associated with the data retrieved from the memory components. When the new cache line is allocated in the first CAM, the LRU indicator can be set to with a sequence number (e.g., a number that is incremented for each operation over time) or a current date/time indicating when the line was accessed, for example, and the MFU indicator can be set to zero.

When a cache line is to be allocated in the first CAM for the content associated with the retrieved data, a cache line in the first CAM that includes invalid data (e.g., determined based on a bit in a metadata field of the first CAM) can be selected first to be allocated for the content. If every cache line in the first CAM includes valid data (e.g., there are no cache lines including invalid data), then a policy to determine which cache line to remove from the first cache can be used. In some embodiments, a LRU policy can be used to select a particular line that is least recently used in the first CAM based on the LRU indicator (e.g., the LRU indicator with the oldest timestamp or value that indicates the cache line is least recently used).

In some embodiments, a determination can be made as to whether the particular line satisfies a condition indicating that content in the particular line is to be stored in the second CAM. For example, the MFU indicator (e.g., located in the first CAM or another portion of memory) can be checked to determine whether a value of the MFU indicator is greater than a threshold number of accesses within a time period. In some embodiments, other statistics can be obtained for each of the lines and the condition can be satisfied depending on those statistics. For example, the statistics can include determining whether a differential between addresses of sectors of a page included in a line are within a certain boundary (e.g., the delta of addresses of the sectors is 1 or 0). The differential is within the boundary, then the line can include a burst of accesses to a particular memory region within a time period and can be a candidate for saving if the line is selected to be removed by the LRU policy. Another condition can include when the line was last accessed (e.g., latency of access). If the last access was in the past by less than a threshold amount of time, then the condition can be satisfied and the content of the particular line can be stored in the second CAM.

Responsive to determining that the particular line satisfies the condition, the content of the particular line can be stored in another line in the set of lines of the second CAM to maintain the data associated with the content in the cache. For example, if the MFU indicator identifies that the particular line was accessed more than a threshold number of times within a time period, then another line in the second CAM can be allocated to store the content of the particular line removed from the first CAM. The another line in the second CAM can include fields for a tag, metadata (e.g., dirty bit, valid bit, etc.), LRU indicator, and/or an address. The LRU indicator can be updated when the another line is allocated in the second CAM, and the tag, metadata, and/or address can be the same in the second CAM as they were in the particular line in the first CAM. The particular line that was removed from the first CAM can be reallocated to store content associated with the retrieved data. Responsive to determining that the particular line does not satisfy the condition, the data in the cache that is associated with the particular line can be removed (e.g., overwritten or evicted to the memory component) from the cache, and content associated with the retrieved data can be stored in the particular line that is freed in the first CAM.

In some embodiments, when the condition is satisfied that indicates the content associated with the particular line is to be stored, a line including invalid data in the second CAM can be selected to be allocated for the content associated with the particular line. If every line in the second CAM includes valid data (e.g., there are no lines including invalid data), then a policy to remove a line in the second CAM can be used. In some embodiments, the policy can be a LRU policy and the line that is least recently used can be selected to be removed (e.g., overwritten or evicted to the memory component) from the second CAM. The content of the particular line that is to be stored can be stored in the line that is freed in the second CAM.

Advantages of the present disclosure include, but are not limited to, an improved performance of the memory sub-system and/or a host system as cache lines associated with burst accesses can be stored in a second CAM and the data associated with the lines can be maintained in the cache for future accesses by applications. By maintaining the data included in memory regions of the burst accesses in the cache, the memory components can be accessed less frequently, thereby improving the endurance of the memory components. Additionally, improving the performance of the memory sub-system can result in energy savings. For example, program-erase (P/E) cycles spent for removing lines associated with the burst accesses can be reduced by saving the content associated with certain lines that satisfy the condition in the second CAM and the data associated with the content in the cache. Reducing P/E cycles can reduce energy consumption.

Figure 1:
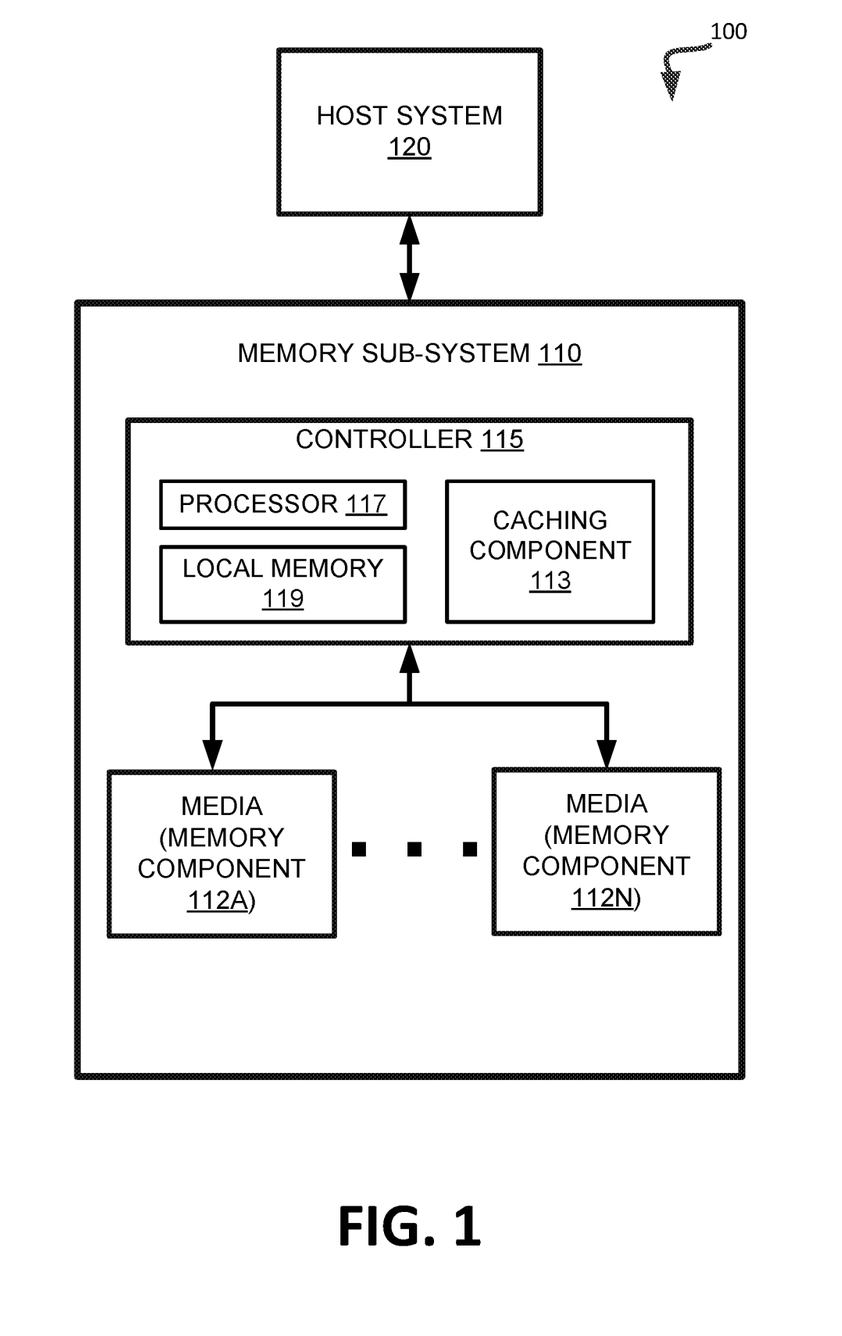
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a caching component 113 that can be used to perform cache management operations of memory burst accesses using a second content-addressable memory for data stored at the memory components 112A-112N. In some embodiments, the controller 115 includes at least a portion of the caching component 113. For example, the controller 115 can include a processor 117 (processing device) configured to execute instructions stored in local memory 119 for performing the operations described herein. In some embodiments, the caching component 113 is part of the host system 110, an application, or an operating system.

The caching component 113 can perform burst caching by maintaining, in a cache, data that is frequently accessed by one or more applications in a memory region within a time period. Statistics related to each line of a set of lines in a first cache can be collected. When a particular line is selected by a policy (e.g., LRU policy) to be removed from the first cache, the caching component 113 can determine, based on the statistics, if a condition is satisfied that indicates the particular line is to be stored in a second cache. For example, the condition may relate to burst accesses of data in a certain memory region within a time period, and the condition can be satisfied when a line is frequently used (e.g., more than a threshold number of times) within that time period. When the condition is satisfied, the caching component 113 can store the content associated with the particular line removed from the first CAM in the second CAM. Further details with regards to the operations of the caching component 113 are described below.

Figure 2:
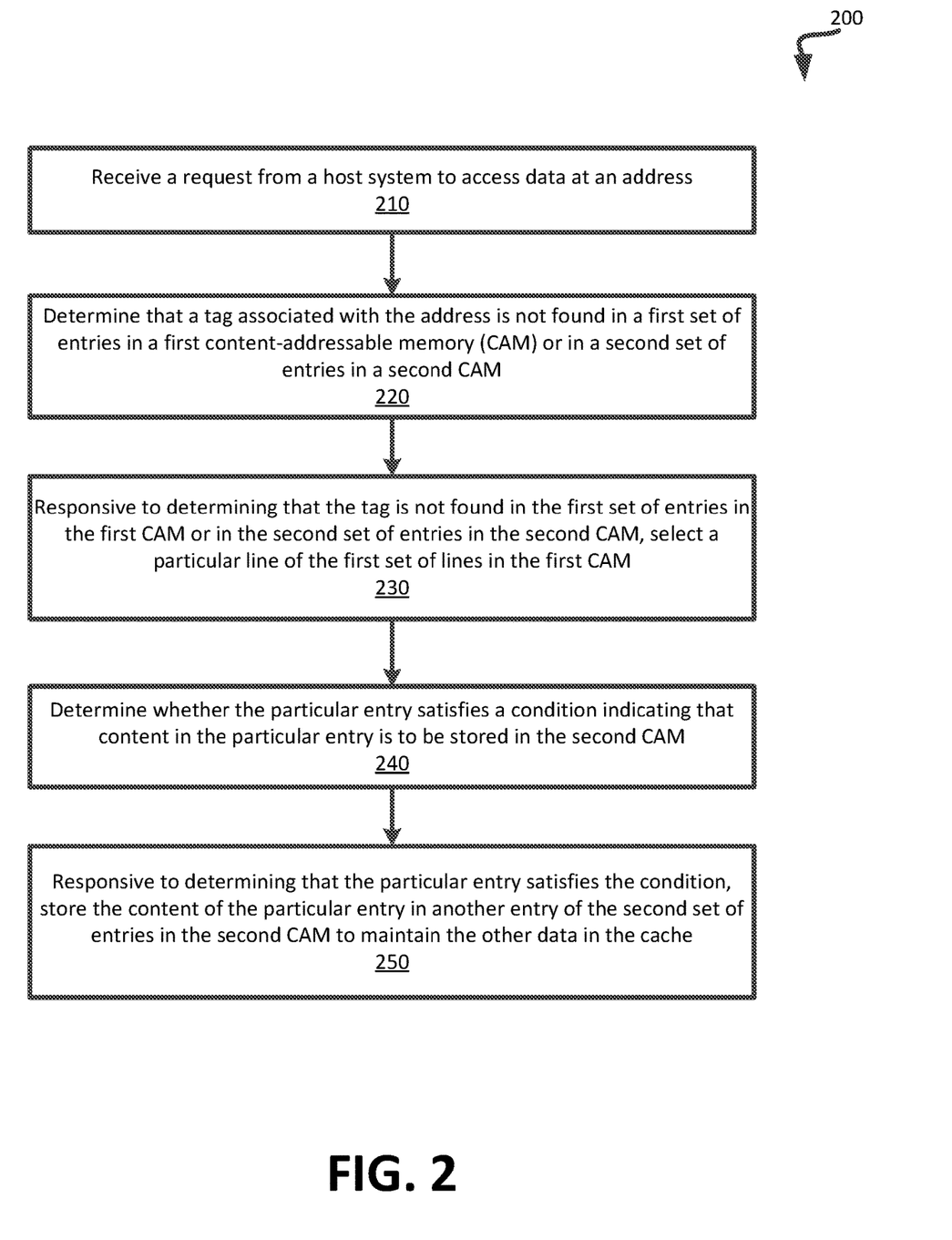
FIG. 2 is a flow diagram of an example method to determine, based on a condition being satisfied, whether to store content associated with a particular line to another line in a second content-addressable memory (CAM) when the particular line is selected to be removed from a first CAM in accordance with some embodiments of the present disclosure.

FIG. 2 is a flow diagram of an example method 200 to determine, based on a condition being satisfied, whether to store content associated with a particular line to another line in a second content-addressable memory (CAM) when the particular line is selected to be removed from a first CAM in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives a request to access data at an address from a host system. The request can be receive from an application executing on the host system. At operation 220, the processing device determines that a tag associated with the address is not found in a first set of lines in a first CAM or in a second set of lines in a second CAM. A line in a CAM can also be referred to as an 'entry.' The first CAM and the second CAM are associated with a cache storing data associated with lines in the first CAM and/or second CAM. In some embodiments, the data is retrieved from the one or more memory components are stored in the cache. A determination can be made whether there is a line in the first CAM that includes invalid data. If there is a line in the first CAM that includes invalid data, content (e.g., tag, metadata, LRU indicator, MFU indicator, address) associated with the data can be stored in the line. In some embodiments, the first CAM can include valid data in each of the set of lines (e.g., the first CAM is full).

At operation 230, responsive to determining that the tag is not found in the first set of lines in the first CAM or the second set of lines in the second CAM, the processing device selects a particular line of the first set of lines that each include valid data in the first CAM to be removed from the first CAM. The processing device can use any suitable policy to select the line to remove. For example, in some embodiments, a LRU policy can be used to select a particular line that is least recently used to remove from the first CAM.

At operation 240, the processing device determines whether the particular line satisfies a condition indicating that content in the particular line is to be stored in the second CAM. The content can be associated with other data and the other data can be stored in the cache. In some embodiments, determining whether the particular line satisfies a condition indicating that content in the particular line is to be stored in the second CAM includes determining that the particular line is associated with a statistic indicating that the particular line was accessed more than a threshold number of times within a time period in a memory region (e.g., the memory region can include addresses that are densely located near each other). Determining that the particular line is associated with the statistic indicating that the particular line was accessed the threshold number of times within the time period can include the processing device identifying a value of a MFU indicator associated with the particular line. The MFU indicator can indicate a frequency of accesses to the particular line within the time period. The processing device can determine that the value satisfies (e.g., is greater than) the threshold number of times to satisfy the condition.

In some embodiments, determining whether the particular line satisfies the condition indicating that content in the particular line is to be stored in the second CAM includes training a machine learning model using a training set including previous memory access requests to identify a pattern of memory usage by the host system. For example, the pattern may specify that a certain application requests data at memory addresses that are densely located near each other (e.g., burst memory accesses) within a time period on a repetitive basis. The machine learning model can be used to output a condition indicating that content in certain lines are to be stored in the second CAM after being trained to recognize the pattern of memory usage for applications running on the host system.

In some embodiments, determining whether the particular line satisfies the condition indicating that content in the particular line is to be stored in the second CAM includes the processing device determining that the particular line is associated with one or more statistics related to a page of the particular line. The one or more statistics can include information related to a differential between addresses of sectors of the page for the particular line. The one or more statistics can include a number of sectors used out of a total number of sectors available in the page. The one or more statistics can include a latency related to when the line was last accessed. Further, in some embodiments, the statistics can be combined to satisfy the condition. For example, even if the MFU indicator includes a value that satisfies the threshold number of accesses within the time period, the processing device can determine whether it has been more than a threshold amount of time since the line was last accessed. If the line was accessed more than a threshold amount of time in the past, then the condition is not satisfied.

In some embodiments, the processing device can receive an indication from the host system that a certain application is going to be requesting memory accesses. The processing device can track the memory usage of the applications that the host system executes. In some embodiments, the processing device can use a rules engine that stores rules for modifying the condition based on the certain application because the certain application has a tendency to request a certain burst of addresses within a time period. In some embodiments, the processing device can use the machine learning model above to output the condition based on the certain application that is going to be requesting memory accesses. Accordingly, the condition can be dynamically changed based on which application is executing.

At block 250, responsive to determining that the particular line satisfies the condition, the processing device stores the content of the particular line in another line of the second set of lines in the second CAM to maintain the other data in the cache. That is, the other data associated with the content that is stored in the second CAM is not removed from the cache. In some embodiments, the processing device can select a line in the second CAM that includes invalid data to store the content associated with the particular line removed from the first CAM. In some embodiments, the processing device can determine that the second set of lines in the second CAM each include valid data (e.g., there are no lines including invalid data), and the processing device can remove one of the second set of lines from the second CAM based on another condition. The another condition can relate to whether the one of the second set of lines was least recently used (e.g., LRU policy), for example.

After the selected line is removed from the second CAM, the content of the particular line to be stored is stored in the one of the second set of lines in the second CAM to maintain the other data in the cache. The processing device can replace the content of the particular line in the first CAM with content associated with the requested address of the data that is retrieved from the memory component. Further, the data associated with the address can be added to the cache.

Responsive to determining that the particular line does not satisfy the condition, the processing device overwrites or evicts the content of the particular line in the first CAM to remove the other data associated with the content from the cache. For example, the condition is not satisfied if the MFU indicator indicates that the line has been accessed less than a threshold number of times within the time period. If the condition is not satisfied, the content of the particular line is not stored in the second CAM. The other data in the cache can be overwritten or evicted to one or more of the memory components. The data that is retrieved for the request can be stored in the cache at the freed location, and the content associated with the retrieved data can be stored in the freed line in the first CAM.

Figure 3A:
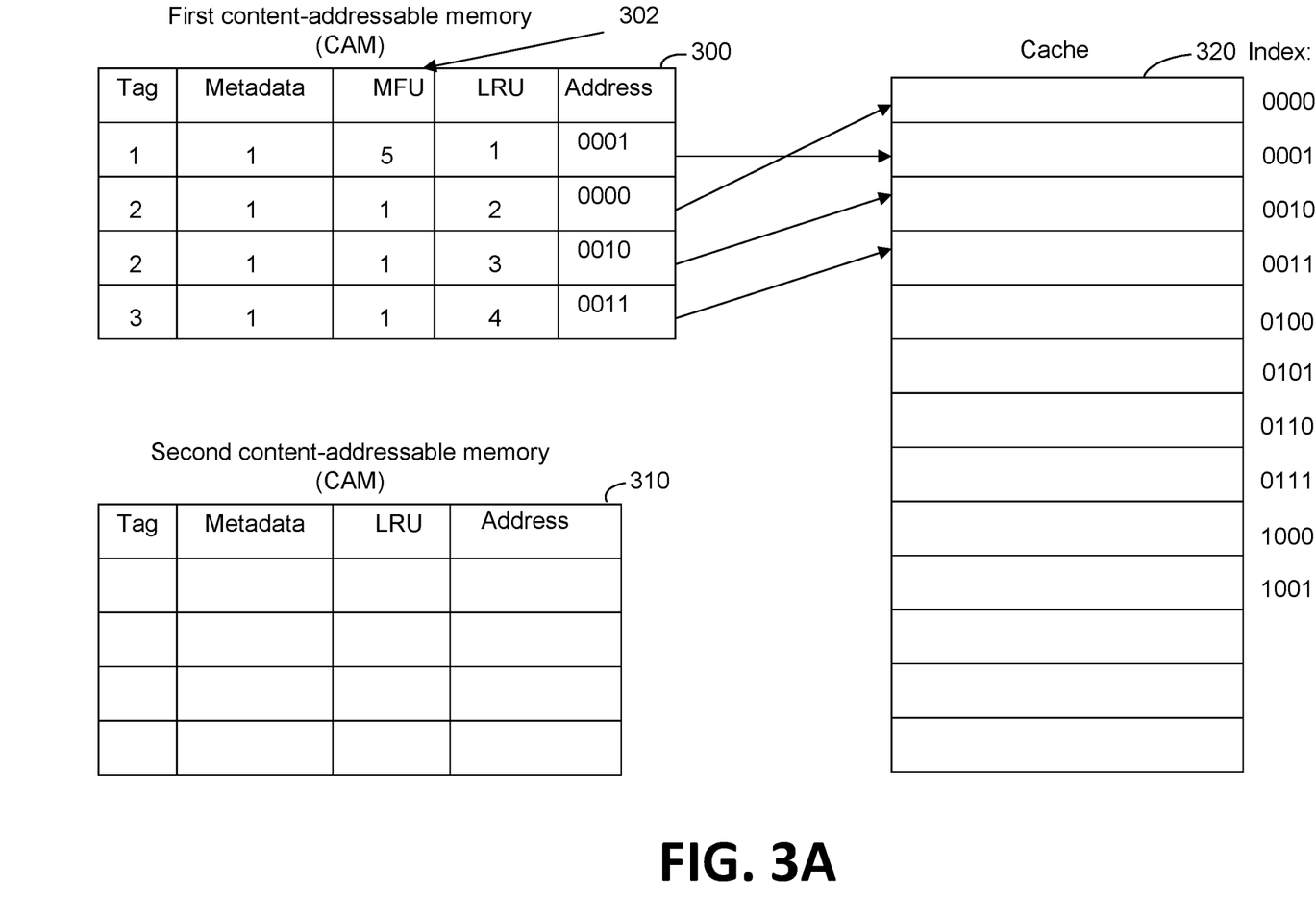
FIG. 3A illustrates an example of a first content-addressable memory including an indicator used to determine whether to store content associated with a particular line selected to be removed from the first CAM in accordance with some embodiments of the present disclosure.

FIG. 3A illustrates an example of a first content-addressable memory (CAM) 300 including an indicator 302 used to determine whether to store content associated with a particular line selected to be removed from the first CAM 300 in a second CAM 310 in accordance with some embodiments of the present disclosure. The first CAM 300 and the second CAM 310 are associated with the cache 320. As depicted, the first CAM 300 can include a first set of lines. Each line is associated with content including fields for a tag, metadata (e.g., valid bit, dirty bit, etc.), the MFU indicator 302, a LRU indicator, and an address. The MFU indicator 302 can be used to determine whether a condition is satisfied to store content of a line selected for removal from the first CAM 300. The LRU indicator can be used to select the line to remove from the first CAM 300. In some instances, the LRU indicator can include a timestamp or other value that indicates when the line was last used.

In some embodiments, a request can be received to access data at a certain address. The processing device can check the first CAM 300 and the second CAM 310 to determine whether a tag associated with the requested address is found in either the first CAM 300 or the second CAM 310. If a matching tag is not found, the processing device can retrieve the data from the memory component and attempt to store content associated with the data in the first CAM 300. In some embodiments, as depicted, each line of the first CAM 300 can include valid data (e.g., valid bit set to 1).

A policy can be used to select a line that is least recently used, for example, to be removed from the first CAM 300. In the depicted example, the line having tag "1" has a LRU indicator indicating the line was used first (e.g., sequence number of "1") and the LRU indicators for the other lines indicate the lines were subsequently used because they have larger sequence numbers of "2", "3", and "4", respectively. Accordingly, the line having tag "1" is least recently used, and the processing device can select that particular line to be removed. When the line is selected to be removed, the processing device can identify the MFU indicator 302 and can determine whether the value of the MFU indicator 302 satisfies (e.g., is greater than or equal to) a threshold number of accesses within a time period. In this example, the threshold number of accesses can be 4, and the MFU indicator 302 for the particular line selected is 5. Accordingly, the condition is satisfied to store content of the particular line because the MFU indicator 302 satisfies the threshold number of accesses within the time period.

Figure 3B:
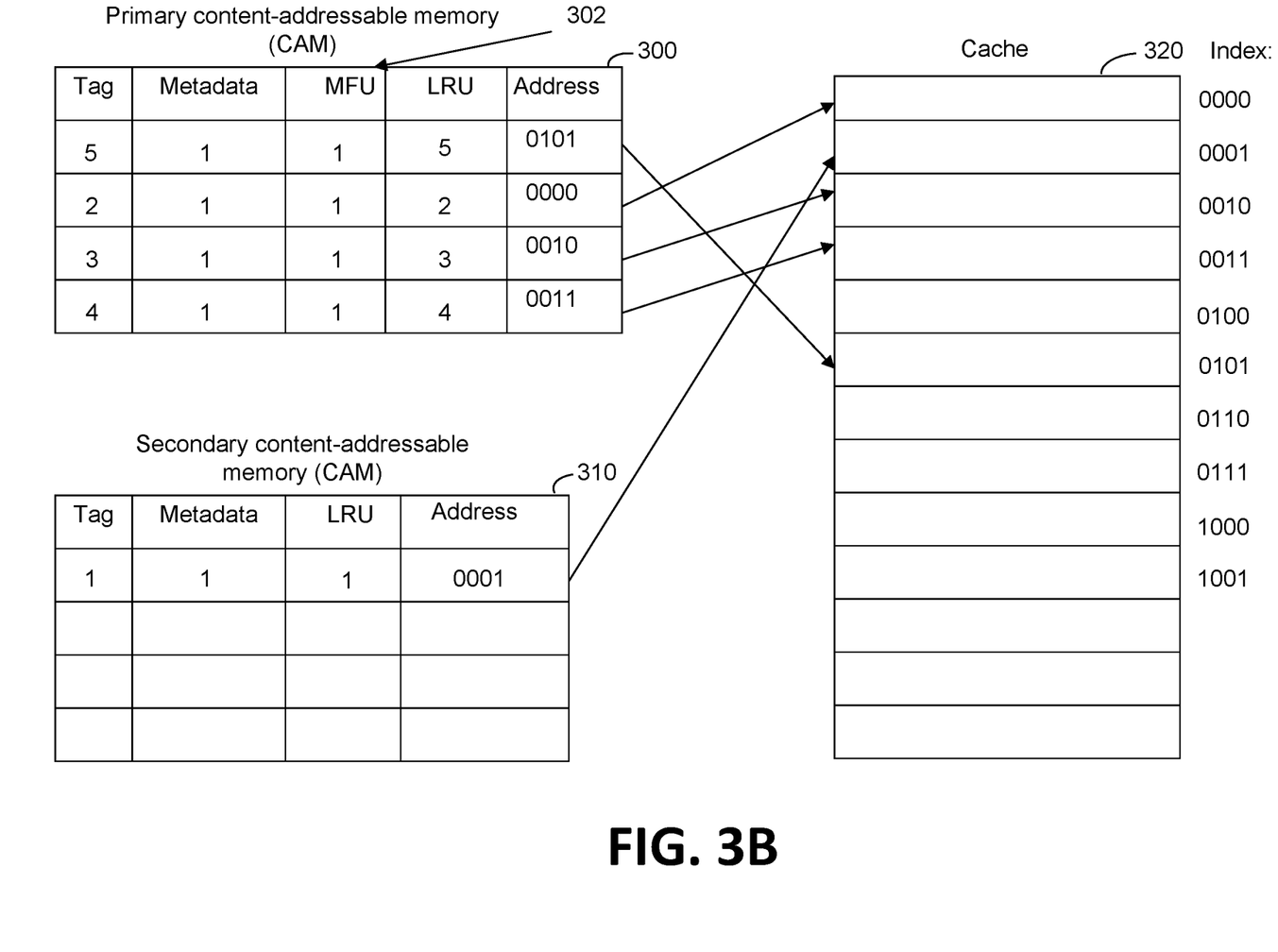
FIG. 3B illustrates an example of performing an operation to store the content of a particular line in a second CAM after the particular line is selected to be removed from a first CAM in accordance with some embodiments of the present disclosure.

FIG. 3B illustrates an example of performing an operation to store the content of the particular line to the second CAM 310 after the particular line is selected to be removed from the first CAM 300 in accordance with some embodiments of the present disclosure. As depicted, the second CAM 310 can include a second set of lines (i.e., entries). Each line or entry is associated with content including fields for a tag, metadata (e.g., valid bit, dirty bit, etc.), an LRU indicator, and an address.

The processing device can receive the particular line removed from the first CAM 300 or the processing device can retrieve the particular line removed from the first CAM 300. In some embodiments, the processing device can identify a line in the second CAM 310 that includes invalid data to store the content of the particular line removed from the first CAM 300. If a line including invalid data is found in the second CAM 310, the processing device can store the content of the particular line in the line in the second CAM 310. As depicted, the content of the particular line that was determined to be stored is stored in a line in the second CAM 310. The LRU indicator can be updated to a value indicating when the content is stored in the second CAM 310. Further, there can be data associated with the content, the data can be stored in the cache 320, and after the content is stored In the second CAM 310, the data can be maintained in the cache 320.

Also, as depicted, the content associated with the requested data is stored in the line that was removed from the first CAM 300. For example, content having tag "5" is stored in the removed line in the CAM 300. The data associated with the content added to the first CAM 300 is stored in the cache 320. The address stored in the line in the first CAM 300 can reference the address of the data in the cache 320.

In some embodiments, every line in the second CAM 310 can include valid data (e.g., the lines are full). In such an instance, the processing device can use a policy to remove one of the lines from the second CAM 310. For example, the LRU policy can be used to check the LRU indicator in the second CAM 310, identify the line that is least recently used, and remove the line from the second CAM 310. The removed line can be used to store the content associated with the particular line that is determined to be stored.

Figure 4:
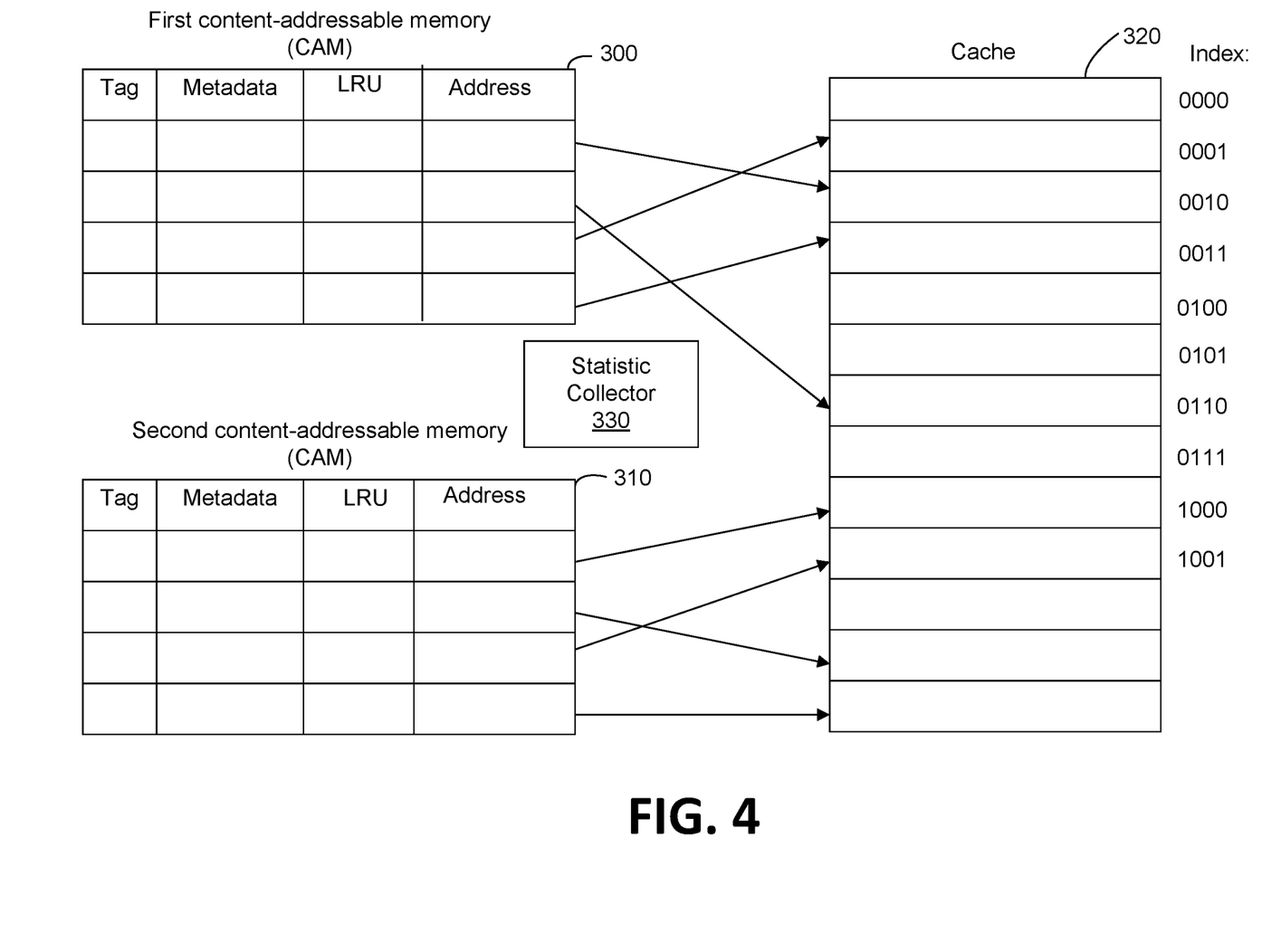
FIG. 4 illustrates an example of a second CAM using a statistic collector to determine whether to store content associated with a particular line removed from a first CAM in accordance with some embodiments of the present disclosure.

FIG. 4 illustrates an example of the second CAM 320 using a statistic collector 330 to determine whether to store content associated with a particular line removed from the first CAM 310 in accordance with some embodiments of the present disclosure. As depicted, the first CAM 300 does not include an MFU indicator. Instead, each line has fields for the tag, metadata, LRU indicator, and address.

The statistic collector 330 may be located in a portion of memory in close proximity to the first CAM 300, the cache 320, and/or the second CAM 310. The statistic collector 330 can collect one or more statistics related to the frequency of accesses to each line within a time period (e.g., the MFU indicator), the differential between addresses in sectors of a page of each line, the number of sectors utilized in a page of each line, the latency of access for the line, and so forth.

When a line is selected to be removed from the first CAM 300, the processing device can obtain statistics from the statistic collector 330 and determine, based on the statistics, whether a condition is satisfied to store the content of the particular line removed from the first CAM 300 in the second CAM 310. If the condition is satisfied, the processing device can retrieve the particular line that is removed from the first CAM 300 and store the content associated with the particular line in another line in the second CAM 310.

Figure 5:
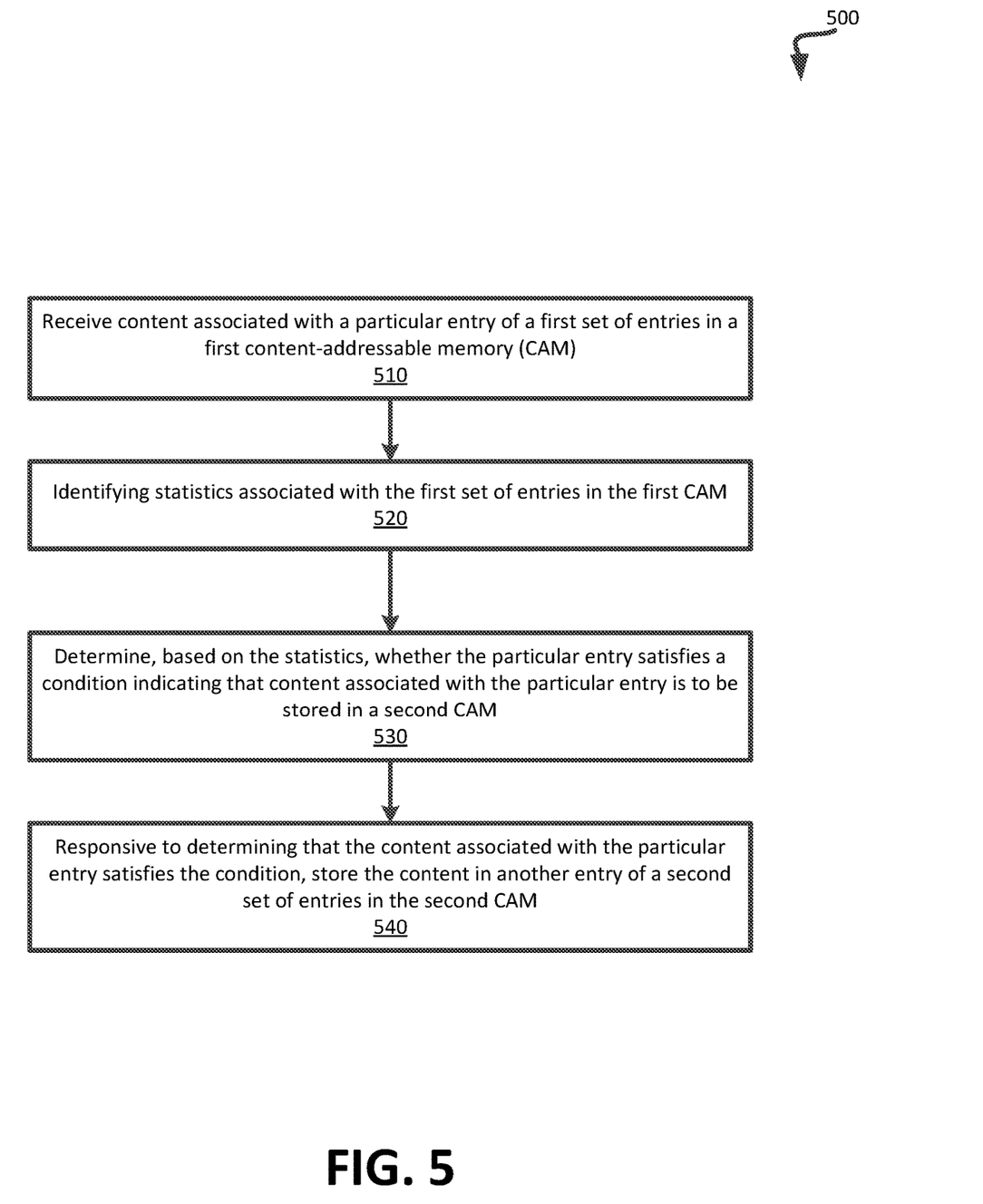
FIG. 5 is a flow diagram of another example method to determine, based on a condition being satisfied, whether to store content associated with a particular line to another line in a second CAM when the particular line is selected to be removed from a first CAM in accordance with some embodiments of the present disclosure.

FIG. 5 is a flow diagram of another example method 500 to determine, based on a condition being satisfied, whether to store content associated with a particular line to another line in a second CAM when the particular line is selected to be removed from a first CAM in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives content associated with a particular line of a first set of lines in a first CAM. The processing device can receive the content by retrieving the particular line when the particular line is selected to be removed from the first CAM. The content may include the tag, metadata (e.g., valid bit, dirty bit, etc.), a LRU indicator, and/or an address for where the data is stored.

At operation 520, the processing device identifies statistics associated with the first set of lines in the first CAM. The statistics can be received from a statistics collector, as depicted in FIG. 4. The statistics can relate to a frequency that each line is accessed within a time period (e.g., the MFU indicator), information related to pages of each of the lines (e.g., differential between addresses of sectors in a page in a line, number of sectors of a page used, etc.), when the lien was last accessed, memory usage patterns of application running on the host system, and so forth.

At operation 530, the processing device determines, based on the statistics, whether the particular line satisfies a condition indicating that content associated with the particular line is to be stored in a second CAM. Determining, based on the statistics, whether the particular line satisfies the condition indicating that content associated with the particular line is to be stored in the second CAM can include determining that the particular line was accessed a threshold number of times (e.g., greater than or equal to the threshold number of times) within a time period. Determining that the particular line was accessed the threshold number of times within the time period includes identifying a value of an indicator (e.g., MFU indicator) associated with the particular line. The indicator can indicate a frequency of accesses to the particular line within a time period. The indicator can be located in the first CAM or can be tracked by a statistic collector separate from the first CAM. Further, the condition can be satisfied when the value of the indicator is greater than or equal to a threshold number of times the line is accessed.

In some embodiments, determining, based on the statistics, whether the particular line satisfies the condition indicating that content associated with the particular line is to be stored in the second CAM can include determining that a differential between addresses of a set of sectors of a page included in the particular line are within a threshold boundary (e.g., a difference of 1 between addresses can show that there was incremental, dense access to the addresses in a memory region).

At operation 540, responsive to determining that the content associated with the particular line satisfies the condition, the processing device stores the content in another line of a second set of lines in the second CAM. If there is a line that includes invalid data (e.g., based on the valid bit being set to 0) in the second CAM, that line is selected to store the content of the particular line removed from the first CAM. If every line in the second CAM includes valid data, then the processing device can remove a line that was least recently used in the second CAM based on the LRU indicator, for example. The line that is removed in the second CAM can be used to store the content of particular line that was removed from the first CAM. The data associated with the content that is stored in the second CAM can be maintained in its current location in the cache.

In some embodiments, responsive to determining that the content associated with the particular line does not satisfy the condition, the processing device can overwrite or evict the content associated with the particular line from the first CAM. Further, the processing device can evict the data associated with the content from the cache and store the data in the memory component.

Figure 6:
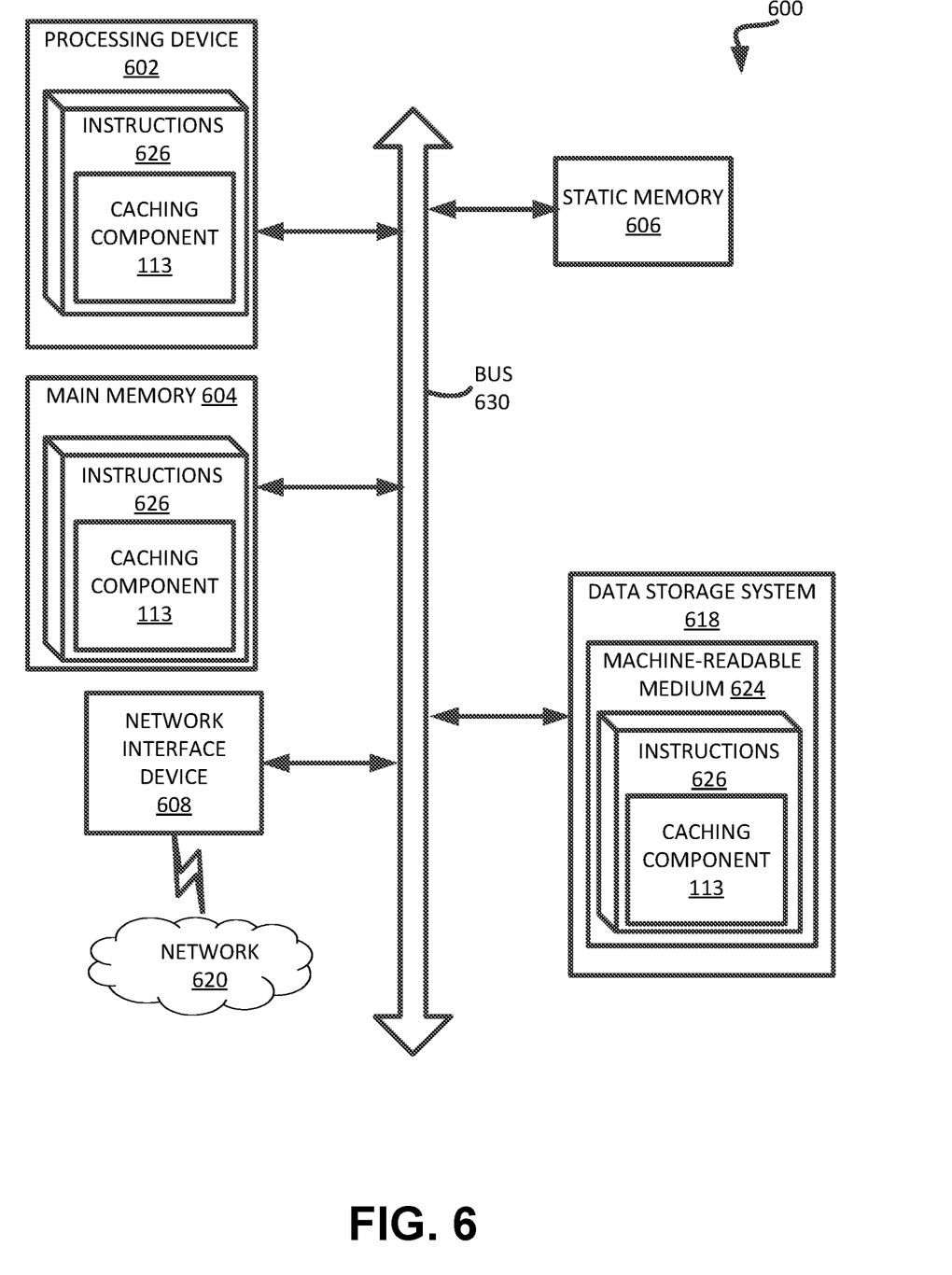
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the caching component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a caching component (e.g., the caching component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    receiving a request from a host system to access a first data at a first address;
    determining that a first tag associated with the first address is not found in either a first plurality of entries in a first content-addressable memory (CAM) or in a second plurality of entries in a second CAM, wherein the first CAM and the second CAM to store a plurality of tags, the plurality of tags indicating that associated data is stored in a cache;
    responsive to determining that the first tag is not found in either the first plurality of entries in the first CAM or in the second plurality of entries in the second CAM indicating that the first data is not stored in the cache, selecting a particular entry of the first plurality of entries in the first CAM, wherein the particular entry comprises a second tag associated with a second address, and wherein second data associated with the second address is stored in the cache;
    determining, by a processing device, whether the particular entry satisfies a condition indicating that content in the particular entry is to be stored in the second CAM and that the second data is to remain in the cache, wherein the particular entry satisfies the condition when a number of times that the particular entry has been accessed within a time period is greater than a threshold number of accesses and an amount of time since the particular entry was last accessed is less than a threshold time; and
    responsive to determining that the particular entry satisfies the condition, (i) selecting another entry, of the second plurality of entries in the second CAM, that includes invalid data, (ii) storing the content of the particular entry of the first plurality of entries in the first CAM to the another entry of the second plurality of entries in the second CAM to maintain the second data in the cache, and (iii) replacing the content of the particular entry in the first CAM with content associated with the first address of the first data to add the first data to the cache.

2. The method of claim 1, further comprising responsive to determining that the particular entry does not satisfy the condition, overwriting or evicting the content of the particular entry to remove the second data from the cache.

3. The method of claim 1, wherein determining that the particular entry has been accessed the threshold number of times within the time period comprises:
    identifying a value of an indicator associated with the particular entry, wherein the indicator identifies a frequency of accesses to the particular entry within the time period; and
    determining that the value satisfies the threshold number of times.

4. The method of claim 1, wherein determining whether the particular entry satisfies the condition comprises:
    identifying a pattern of memory usage by the host system, wherein the pattern of memory usage specifies burst memory accesses by the host system within a time period;
    determining whether particular entry satisfies the condition is based on the pattern of memory usage by the host system.

5. The method of claim 1, wherein determining whether the particular entry satisfies the condition comprises:
    determining that the particular entry is associated with one or more statistics related to a page of the particular entry, wherein the one or more statistics comprise information related to a differential between addresses of a plurality of sectors of the page.

6. The method of claim 1, wherein selecting the particular entry of the first plurality of entries in the first CAM comprises:
    determining whether the particular entry satisfies another condition associated with the particular entry being least recently used relative to other entries of the first plurality of entries.

7. The method of claim 1, further comprising:
    receiving an indication from the host system that an application is to request memory accesses; and
    modifying the condition based on the application.

8. The method of claim 1, further comprising:
    responsive to determining that the second plurality of entries in the second CAM each include valid data, removing one of the second plurality of entries from the second CAM based on another condition that relates to whether the one of the second plurality of entries was least recently used; and
    storing the content of the particular entry in the one of the second plurality of entries in the second CAM to maintain the second data in the cache.

9. A system, comprising:
    a memory component; and
    a processing device operatively coupled to the memory device, the processing device to:
        receive a request from a host system to access a first data at a first address;
        determine that a first tag associated with the first address is not found in either a first plurality of entries in a first content-addressable memory (CAM) or in a second plurality of entries in a second CAM, wherein the first CAM and the second CAM to store a plurality of tags, the plurality of tags indicating that associated data is stored in a cache;

responsive to determining that the first tag is not found in either the first plurality of entries in the first CAM or in the second plurality of entries in the second CAM indicating that the first data is not stored in the cache, select a particular entry of the first plurality of entries in the first CAM, wherein the particular entry comprises a second tag associated with a second address, and wherein second data associated with the second address is stored in the cache;

determine whether the particular entry satisfies a condition indicating that content in the particular entry is to be stored in the second CAM and that the second data is to remain in the cache, wherein the particular entry satisfies the condition when a number of times that the particular entry has been accessed within a time period is greater than a threshold number of accesses and an amount of time since the particular entry was last accessed is less than a threshold time; and responsive to determining that the particular entry satisfies the condition, (i) selecting another entry, of the second plurality of entries in the second CAM, that includes invalid data, (ii) store the content of the particular entry of the first plurality of entries in the first CAM in the another entry of the second plurality of entries in the second CAM to maintain the second data in the cache, and (iii) replacing the content of the particular entry in the first CAM with content associated with the first address of the first data to add the first data to the cache.

10. The system of claim 9, wherein to determine that the particular entry has been accessed the threshold number of time within the time period, the processing device is further to:

identify a value of an indicator associated with the particular entry, wherein the indicator identifies a frequency of accesses to the particular entry within the time period; and determine that the value satisfies the threshold number of times.

11. The system of claim 9, wherein the processing device is further to replace the content of the particular entry in the first CAM with content associated with the first address of the first data to add the first data to the cache.

12. The system of claim 9, wherein to select the particular entry of the first plurality of entries in the first CAM to be removed from the first CAM, the processing device is further to:

determine whether the particular entry satisfies another condition associated with the particular entry being least recently used relative to other entries of the plurality of entries.

13. A non-transitory computer-readable storage medium storing instructions which, when executed by a processing device, cause the processing device to perform operations comprising:

receiving a request from a host system to access a first data at a first address;

determining that a first tag associated with the first address is not found in either a first plurality of entries in a first content-addressable memory (CAM) or in a second plurality of entries in a second CAM, wherein the first CAM and the second CAM to store a plurality of tags, the plurality of tags indicating that associated data is stored in a cache;

responsive to determining that the first tag is not found in either the first plurality of entries in the first CAM or in the second plurality of entries in the second CAM indicating that the first data is not stored in the cache, selecting a particular entry of the first plurality of entries in the first CAM, wherein the particular entry comprises a second tag associated with a second address, and wherein second data associated with the second address is stored in the cache;

determining whether the particular entry satisfies a condition indicating that content in the particular entry is to be stored in the second CAM and that the second data is to remain in the cache, wherein the particular entry satisfies the condition when a number of times that the particular entry has been accessed within a time period is greater than a threshold number of accesses and an amount of time since the particular entry was last accessed is less than a threshold time; and responsive to determining that the particular entry satisfies the condition, (i) selecting another entry, of the second plurality of entries in the second CAM, that includes invalid data, (ii) storing the content of the particular entry of the first plurality of entries in the first CAM to the another entry of the second plurality of entries in the second CAM to maintain the second data in the cache, and (iii) replacing the content of the particular entry in the first CAM with content associated with the first address of the first data to add the first data to the cache.

14. The non-transitory computer-readable storage medium of claim 13, wherein the operations further comprise responsive to determining that the particular entry does not satisfy the condition, overwriting or evicting the content of the particular entry to remove the second data from the cache.

15. The non-transitory computer-readable storage medium of claim 13, wherein determining that the particular entry has been accessed the threshold number of times within the time period comprises:

identifying a value of an indicator associated with the particular entry, wherein the indicator identifies a frequency of accesses to the particular entry within the time period; and determining that the value satisfies the threshold number of times.

16. The non-transitory computer-readable storage medium of claim 13, wherein determining whether the particular entry satisfies the condition comprises:

identifying a pattern of memory usage by the host system, wherein the pattern of memory usage specifies burst memory accesses by the host system within a time period;

determining whether particular entry satisfies the condition is based on the pattern of memory usage by the host system.

17. The non-transitory computer-readable storage medium of claim 13, wherein determining whether the particular entry satisfies the condition comprises:

determining that the particular entry is associated with one or more statistics related to a page of the particular entry, wherein the one or more statistics comprise information related to a differential between addresses of a plurality of sectors of the page.

18. The non-transitory computer-readable storage medium of claim 13, wherein selecting the particular entry of the first plurality of entries in the first CAM comprises:
   determining whether the particular entry satisfies another condition associated with the particular entry being least recently used relative to other entries of the first plurality of entries.

19. The non-transitory computer-readable storage medium of claim 13, wherein the operations further comprise:
   receiving an indication from the host system that an application is to request memory accesses; and
   modifying the condition based on the application.

20. The non-transitory computer-readable storage medium of claim 13, wherein the operations further comprise:
   responsive to determining that the second plurality of entries in the second CAM each include valid data, removing one of the second plurality of entries from the second CAM based on another condition that relates to whether the one of the second plurality of entries was least recently used; and
   storing the content of the particular entry in the one of the second plurality of entries in the second CAM to maintain the second data in the cache.

* * * * *